United States Patent [19]

Fohl

[11] 3,864,774
[45] Feb. 11, 1975

[54] THREAD CUTTING DEVICE
[75] Inventor: Arthur Fohl, Haubersbronn, Germany
[73] Assignee: Remswerk Christian Foll & Sohne, Waiblingen, Germany
[22] Filed: Mar. 5, 1973
[21] Appl. No.: 338,408

[30] Foreign Application Priority Data
Mar. 6, 1972 Germany............................ 2210668

[52] U.S. Cl.................. 10/120.5, 10/96 T, 10/107, 10/89 H, 408/157, 408/178
[51] Int. Cl........................ B23g 5/12, B23g 11/00
[58] Field of Search .......... 10/96 T, 96 R, 120.5 R, 10/89 H; 408/157, 177, 178, 184

[56] References Cited
UNITED STATES PATENTS

| 962,024 | 6/1910 | Hart | 10/120.5 R |
|---|---|---|---|
| 1,017,148 | 2/1912 | Hart | 10/120.5 R |
| 1,081,293 | 12/1913 | Benson | 10/120.5 R |
| 1,125,112 | 1/1915 | Juergens | 10/120.5 R |
| 1,153,835 | 9/1915 | Walter | 10/120.5 R |
| 1,999,207 | 4/1935 | Pealer | 10/120.5 R |
| 2,629,886 | 3/1953 | Halligan | 10/120.5 R |
| 3,188,666 | 6/1965 | Brown et al | 10/120.5 R |
| 3,599,261 | 8/1971 | Fohl | 10/96 R X |

FOREIGN PATENTS OR APPLICATIONS
343,747  2/1931  Great Britain ..................... 10/96 T Primary Examiner—C. W. Lanham
Assistant Examiner—D. M. Gurley
Attorney, Agent, or Firm—Walter Becker

[57] ABSTRACT

A device for cutting threads on a workpiece such as a pipe, and especially conical threads such as pipe threads, in which a chuck housing is nonrotatably but axially moveably connected to a cutter housing. A workpiece is inserted in the chuck housing with the end of the workpiece engaging cutters in the cutter housing and is clamped in the chuck housing. A drive drives the cutters in rotation thereby forming a thread on the workpiece while drawing the workpiece through the cutters and a drive mechanism is actuated by the movement of the workpiece and chuck housing toward the cutter housing for causing gradual retraction of the cutters during a cutting operation. At the end of the cutting operation, the cutters retract outwardly and the workpiece can then be removed and the parts of the device restored to the original position thereof preparatory to another cutting operation.

15 Claims, 16 Drawing Figures

THREAD CUTTING DEVICE

The present invention relates to a thread cutting device for conical thread, especially outer pipe thread, with a cutting head comprising a carrier housing or the like, the cutting jaw carrier of which has transverse to the cutting head axis displaceably mounted thereon at least one cutting jaw which is adapted to be driven in displacement direction by a control disc through the intervention of a guiding member engaging a guiding curve. The control disc is rotatable relative to the cutting jaw carrier about the cutting head axis. The device furthermore comprises a chuck which is axially displaceable relative to the cutting head for chucking the work piece and is furthermore provided with a driving device for turning the work piece relative to the cutting jaw carrier.

According to a heretofore known thread cutting device, the advance is effected by means of a guiding mandrel or guiding thread while behind the cutting jaw carrier is arranged a control disc which turns in response to the axial movement of the cutting head and sets the cutting jaws transverse to the axis of the cutting head so that a predetermined conical thread will be obtained. After the thread has been made to the desired length, the cutting head has to be opened manually, and by reversing the driving direction, the device has to be returned to its starting position. This operation is time-consuming inasmuch as for each return for the opening of the cutting jaws and the closing thereof, considerable time is required. Inasmuch as furthermore with the heretofore known device, the work piece carries out the rotationally working movement, it will be appreciated that with long work pieces, bearing problems and in addition high accident dangers are encountered.

It is, therefore, an object of the present invention to provide a thread cutting device of the above mentioned type which will assure a fast working while the handling of the device according to the invention is rather simple.

This and other objects and advantages of the invention will appear more clearly from the following specification in connection with the accompanying drawings, in which.

Figure 1:
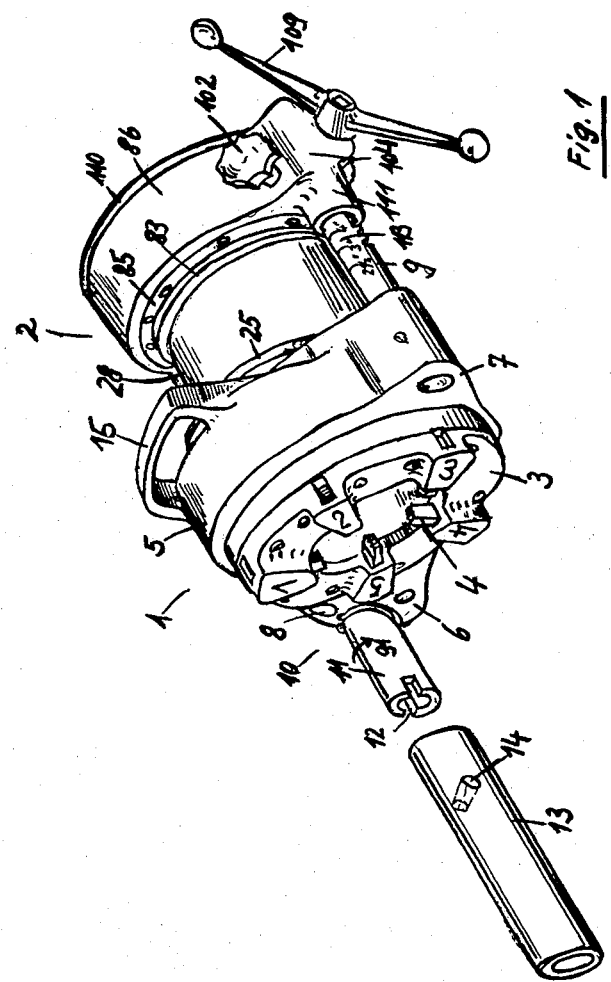
FIG. 1 is an isometric view of a thread cutting device according to the invention.

The above outlined object has been realized by a thread cutting device according to the present invention in which the cutting jaw carrier is rotatable about the cutting head axis and is mounted on the carrier housing which is non-rotatably connected to the chuck. Furthermore, the cutting jaw carrier is operatively connected to the driving device. Furthermore, the control disc is drivingly connected to the chuck through a reversing drive the driving element of which is axially displaceable with the chuck while the output element of said reversing drive is axially displaceable with the chuck and while the output element connected to the control disc is rotatable about the cutting head axis. In this way, the work piece can during the cutting of the thread be held non-variable, and it is possible to change the position of the cutting jaws in a minimum time merely by a correspondingly axial displacement of the chuck in any desired manner.

Expediently, the driving element of the reversing drive is formed by a sleeve-shaped element which extends in the cutting head axial direction and preferably forms a sleeve-like element and is preferably non-rotatable relative to the cutting jaw carrier so that in spite of a simple and light construction, a protected design is obtained. The axial movement of the chuck may in a simple manner be converted into a rotary movement for the control disc by drivingly connecting the driving element of the reversing drive with the output element through at least one intermediate element which engages an inclined surface that deviates from the direction of the cutting head axis, while preferably the inclined surface is provided on the output element and thereby can easily be adjusted. A very precise adjustment of the control disc in both directions of movement can be realized when the inclined surface is formed by a groove which appreciably is provided at the outer circumference of the sleeve-shaped output element.

In order to obtain an easy operation, the intermediate member is formed by a rolling element, especially a ball, which may be safely mounted in a cage bore of the driving element.

In order to prevent the driving element from twisting relative to the cutting jaw carrier, the driving element may in a simple manner through a torsion safety element engaging an axial groove be connected to the cutting jaw carrier. Advantageously, the axial groove is provided on the inner circumference of a portion which is connected to the cutting jaw carrier, and the torsion safety element is formed by the intermediate member of the reversing drive so that a separate torsion-resistant element is not necessary.

For furthermore improving the compactness of the structure of the thread cutting device according to the invention, the driving element of the reversing transmission axially displaceably engages a preferably annular gap between the output element and the one part connected to the cutting jaw carrier. In this connection, a further simplification in the structure according to the invention is obtained when the output wheel of the driving device which is connected to the cutting jaw carrier is arranged about the output member while the inner circumference of the driving device is preferably provided with an axial groove.

A particularly advantageous further development of the invention is obtained when the control disc is rotatably journalled on the output member so as to be rotatable about the cutting head axis, and if the control disc is spring loaded in the rotary working direction of said output member while preferably the control disc and the output disc in one position, especially in the starting position, are locked by means of a disengagable locking device. In this way, the control disc can after completion of the axial advancing stroke of the chuck head, still be rotated in a shock-like manner relative to the output element in such a way that the cutting jaws open at the end of the thread cutting operation in an extremely short period of time.

The control disc is preferably in a space-saving manner located between the cutting jaw and that end of the output element which faces said cutting jaw, while said control disc is preferably with a bearing neck which extends over the end collar of the output element safely journalled on the working element.

In order to be able when returning the chuck to its starting position, in a simple manner to move the control disc in the direction toward its starting position, the spring exerting pressure upon the control disc and, for instance, being designed as a helical pressure spring is designed as return follower for the control disc. This spring, preferably in the working end position of the control disc has its ends engage abutment surfaces which extend transverse to the direction of rotation of the control disc and has its ends also engage the output member of the reversing drive. A simple design and easy assembly is obtained by the fact that the engaging or abutment surfaces are formed by the end surfaces of two grooves on those end faces of the control disc and output member which face each other, and that the grooves together form a receiving opening for the spring.

In order to assure that the control disc will safely and automatically, when returning the chuck more into its starting position opposite the output member, the control disc and the output member of the reversing drive are through a return advance drive for the control disc operatively connected to each other. This drive preferably comprises a return lever journalled on one part and pivotable about an axis parallel to the cutting head axis. this return lever is in spaced relationship to its pivot axis connected to the other part through a follower which engages an opening or the like, for instance, a radial slot. This return lever is furthermore provided with a cam having an ascending surface while a member adapted to move onto said cam is located in the returning path of said cam. When returning the chuck to its starting position, the returning lever with its returning cam moves onto the returning member so that the latter is pivoted whereby the control disc is returned to its starting position opposite the output member. A simple design is obtained when the return lever is mounted on the output member preferably in a recess which extends to the circumference and is located at the end face of the end collar of said output member. In particular, in this instance, the cam may in a simple manner be formed by that edge of the return lever which faces away from the cutter head axis while the cam preferably projects beyond the circumference of the end collar and thereby can easily be brought into engagement with the member cooperating with the cam.

For further simplification, the follower is, with regard to the cutter head axis located radially further outwardly than the pivot axis of the return lever while preferably the follower is in both end positions of the return lever located on oppositely located sides of the axial plane of the cutter head which passes through the pivot axis of said return lever so that favorable lever forces are obtained. The member cooperating with said cam which member is preferably formed by a roller or the like, may in a simple manner be provided on a part which is non-rotatably connected to the cutter head, preferably is located in a space saving manner on the inner circumference of the cutter head in a depression thereof.

According to a further development of the invention, the locking device comprises a pivotable latch which is preferably pivotable about an axis tangential to the cutter head axis. This latch is spring loaded and urged into a locking position which engages a locking opening, or the like, and is preferably mounted in a space saving manner in an axial slot of the end collar of the output member. In this way, a very safe locking arrangement is obtained.

In order to make sure that the unlocking of the control disc at the end of the thread cutting operation will be effected automatically in a simple manner, the locking device is, for purposes of releasing it, provided with a release member which is located in the path of movement of the driving member of the reversing drive. This releasing member is preferably formed by an arm of the locking lever and is located in the path of movement of the pertaining end of the driving member. For purposes of obtaining a compact construction, the locking lever is angular while one arm forms the locking element which engages the locking opening or the like, while the locking opening is preferably located at the bearing neck of the control disc. If the width of the latch equals at least that of the adjusting path of the control disc opposite the output member, the spring which loads the latch may be located on one part and the latch may be located on the other part of the two parts which are locked with regard to each other because in such an instance the spring will with each relative position between the two two parts still engage the latch.

For purposes of improving the mounting of the support for the cutting jaws, of the control disc, and of the output member of the reversing member, the control disc and/or the end collar of the output member is, or are surrounded by a bearing ring journalled in the carrier housing. This bearing ring is preferably axially clamped between the output wheel of the driving device and the carrier for the cutting jaws and in particular comprises the member cooperating with the cam so that no special part is necessary for mounting the latter.

According to a further feature of the invention, the control disc forming the guiding cam has that end face thereof which faces toward the cutting jaw provided for each cutting jaw with a guiding groove which from the radial course deviates toward the cutting head axis. The cutting jaw with its guiding member engages said last mentioned guiding groove which is engaged by the guiding member of the cutting jaw. The guiding groove is preferably at one end provided with a substantially radial inlet section which extends to the outer circumference of the control disc. However, if desired, the guiding groove may also extend concentrically at least partially coaxial with regard to the axis of the cutting head so that the thread cutting device according to the invention will also be able to cut cylindrical thread.

In order to realize a very fast opening movement of the cutting jaws at the end of the thread cutting operation, the guiding cam has two sections of different inclination while preferably that section which has the greater distance from the inlet section has a greater angle of ascent, and the guiding member is located in the transition region between the two sections of the guiding cam when the output member of the reversing drive holds the latch of the latching device in its release position.

For purposes of obtaining a safer drive of the cutting jaw carrier, the driving device comprises a pinion which engages the drive wheel and is preferably axis parallel to said drive wheel while being located in the carrier housing. Non-rotatably connected to said pinion is a coupling shaft which is located along the axis of said pinion and extends out of the carrier housing. Preferably, the pinion is through an intermediate gear drivingly connected to the driving wheel so that the carrier for the cutting jaws will rotate in the same direction as the coupling shaft. Thus, the thread guiding device can, for instance, in a simple manner by a thread cutting machine be driven by clamping the coupling shaft into the rotating chuck of said machine. This is of particular advantage when, as customary, the thread cutting machine and the thread cutting device have chucks which primarily tighten only in a direction counter to the direction of rotation and more specifically counter to the same direction of rotation.

The driving member of the reversing drive may for a safer mounting have that end thereof which is located adjacent to the chuck provided with an end collar which, by means of a circumferential groove is mounted on a bearing ring of the chuck. For purposes of more safely mounting the chuck, the carrier housing has connected thereto two axis parallel, preferably cylindrical guiding rods on which the chuck is displaceably mounted. These rods are preferably located in a common axial plane of the cutting head. The guiding rods are expediently connected to laterally protruding eyes of the carrier housing. One of said eyes also received the pinion and/or the intermediate gear of the driving device.

According to a further development of the invention, one guiding rod, especially the guiding rod which is located opposite the pinion is designed as a rack, preferably at the bottom side of said rod, which meshes with an advancing pinion which is operable by a handle and is mounted on the chuck, so that the chuck can be axially displaced in a very simple manner.

In order to be able to chuck the workpiece in a particularly simple and safe manner, there are provided a plurality of clamping jaws which are distributed about the axis of the cutting head and are pivotable about axes in a chuck housing which are parallel to said cutter head axis. Each of said clamping jaws is between its pivotal mounting and its clamping surace linked to a clamping ring which is rotatable about the cutter head axis and which is connected preferably to a clamping spindle provided with a handle substantially tangential to said cutter head axis. By means of said clamping spindle, the clamping ring can be turned in a simple manner. For purposes of obtaining a compact construction, the clamping ring is located on that side of the clamping jaws which face the cutter head and preferably is provided between said clamping jaws and the clamping spindle.

In order to be able to turn the clamping ring safely in clamping direction, the end of the clamping spindle engages an extension which is provided on the pertaining end face of the clamping ring. The clamping spindle, preferably adjacent to said extension has a circumferential groove engaged by a pin, or the like, arranged on the clamping ring, so that the latter also in return direction can be adjusted by the clamping spindle.

Figure 2:
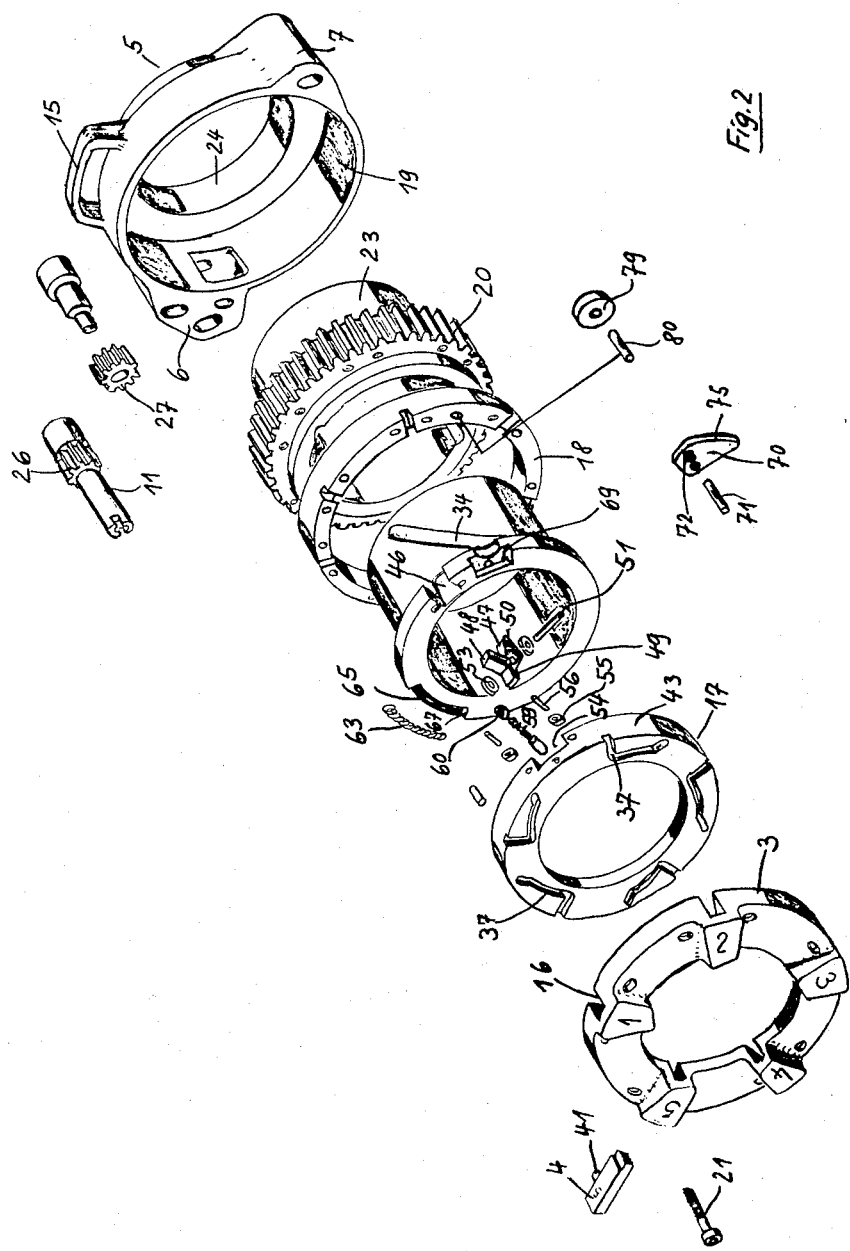
FIG. 2 shows the cutting head of the thread cutting device according to FIG. 1 in exploded isometric illustration.

Referring now to the drawings in detail, FIGS. 1 and 2 show a thread cutting device according to the present invention which has a cutter head 1 and a chuck 2 for chucking work pieces, the chuck being located along the axis of the cutter head 1. At that end face of the cutter head 1 which faces away from the chuck 2, the cutter head 1 is provided with a carrier 3 for carrying cutting jaws, the carrier 3 being provided with means for approximately radially displacing five cutting jaws 4 which are uniformly distributed around the axis of the cutter head. The cutter head carrier 3 is rotatable about the cutter head axis and is jouranlled in a carrier housing 5 of the cutter head 1. In two eyes 6, 7 of the housing 5 which are located diametrically opposite to each other there are fastened two guiding bars 8, 9 (FIG. 4) which are axis-parallel to the cutter head 1 and are arranged along a common axial plane of the cutter head 1. On these guiding bars 8, 9 there is displaceably arranged the chuck 2 so as to be displaceably arranged relative to the cutter head 1. A coupling shaft 11 of a driving device 10 protrudes from one eye 6 of the carrier housing 5 at that end face of the cutter head 1 which faces away from the chuck 2. The coupling shaft 11 has one end thereof provided with a diametrically arranged slot 12 for coupling engagement with a tubular intermediate member 13 which comprises a corresponding diametrically arranged pin 14. The intermediate member 13 may, for instance, be chucked into the rotatable chuck of a thread cutting machine by means of which the thread cutting device is driven. At the top side of the housing 5 within the region of its end face which faces toward chuck 2 there is provided a handle 15 by means of which the thread cutting device can be transported which is provided, for instance, for cutting threads on pipes, which thread may vary from 2½ to 4 inches.

As will be seen from FIGS. 1–4, the cutting jaw carrier 3 has its inner end face which faces the chuck 2 provided with approximately radial grooves 16 which are uniformly distributed about the circumference of the carrier 3 and are intended for receiving the cutting jaws 4. This end face is engaged by an annular rotatable control disc 17 which has a diameter somewhat less than the cutting jaw carrier 3. The control disc 17 is surrounded by a bearing ring 18 which likewise engages the end face and has the same diameter as the cutting jaw carrier 3. The bearing ring 18 is rotatably journalled in a bearing bore 19 of the carrier housing 5 and, more specifically, within the region of the pertaining end face. On that end face of the bearing ring 18 which faces away from the cutting jaw carrier 3 there is arranged the output gear 20 of the driving device 10, the output gear 20 being arranged in spaced relationship to the control disc 17. The cutting jaw carrier 3, the bearing ring 18 and the output gear 20 are braced relative to each other by means of parallel screws 21 which are distributed about the axis 22 of the cutter head and are parallel thereto. The screws 21 are accessible from the outer end face of the carrier 3 so that after loosening the screws 21, the control disc 17 can in a simple manner be removed and, for instance, be exchanged. The output gear 20 has that end face thereof which faces away from the cutting jaw carrier 3 provided with an axially protruding bearing extension 23 which has a somewhat reduced diameter and by means of which the output gear 20 is rotatably journalled in a corresponding bearing bore 24 of the carrier housing 5. A ring 25 which extends over the end face of the bearing extension 23 is connected to the end face. Ring 25 rests against the pertaining outer end face of the carrier housing 5 and thereby prevents the output gear 20 from axial displacement. Below the pertaining guiding rod 8, one eye 6 of the sleeve-shaped carrier housing 5 forms a housing for a driving pinion 26 and for an intermediate gear 27 meshing with gear 26. The gear 27 meshes with the outer teeth of the output gear 20. The pinion 26 is non-rotatably connected to the coupling shaft 11 arranged along its axis.

Rotatably engaging the circumferential surface of the output gear 20 is a sleeve-shaped driving member 28 of a reversing transmission 30. This driving member 28 which is located along the cutting head axis is rotatably but axially non-displaceably connected to the chuck 2. The driving member 28 of the reversing transmission 30 has its inner mantle surface in rotatable engagement with the outer mantle surface of an output member 29 of the reversing transmission 30, the output member 29 being located within the output gear 20. The transmission 30 is in at least one position non-rotatably connected to the control disc 17. The output gear 20 and the output member 29 thus form an annular gap 32 for the axially displaceable engagement by the driving member 28. At two points which around the cutting head axis 22 are offset with regard to each other, the driving member 28 of the reversing transmission 30 is at that end thereof which faces the cutter head 1 provided with a cage hole 33 in which a ball 31 is located as intermediate member of the reversing transmission 30. The diameter of the ball 31 is approximately two times greater than the wall thickness of the driving member 28 so that the ball 31 protrudes not only beyond the outer mantle surface but also beyond the inner mantel surface of the driving member 28. In the outer mantel surface of the output member 29 there are provided two helical grooves 34 which are offset with regard to each other by 180° and which form inclined surfaces and which are engaged by the balls 31. On the inner mantle surface of the output gear 20 there are provided two axial grooves 35 which are offset with regard to each other and are likewise engaged by the balls 31 in such a way that the driving member 28 of the reversing transmission 30 is secured against turning and is connected to the output gear 20. When the driving member 28 of the reversing transmission 30 carries out an axial movement, this movement is converted into a rotary movement carried out by the output member 29 and the control disc 17. The device operates in both directions of the axial displacement so that the output member 29, depending on the direction of displacement of the driving member 28, is turned either in clockwise or in counter-clockwise direction relative to the output gear 20 and thus relative to the cutting jaw carrier 3.

Figure 7:
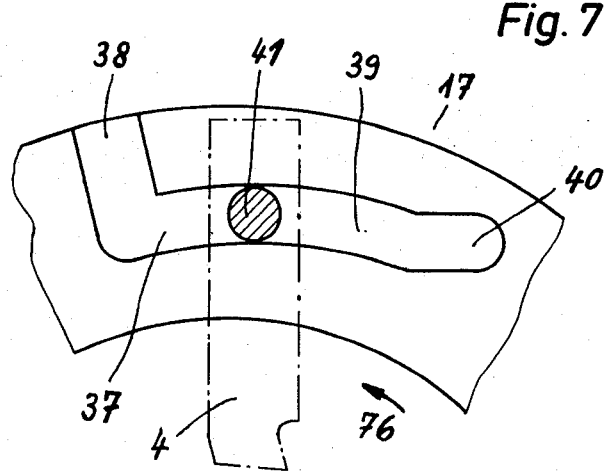
FIG. 7 is a partial section taken along the line VII—VII of FIG. 3 on an enlarged scale.

The control disc 17 has that plane end face 36 which faces toward the cutting jaw carrier 3 provided with five grooves 37 (FIG. 7) which are uniformly distributed or in conformity with the cutting jaws 4. Each groove 37 has three uneven sections 38–40. The first section forms an inlet section 38 which is radial with regard to the cutter head axis, whereas the other two sections 39, 40 form a guiding groove and with regard to the course which is concentric to the cutting head axis has different inclinations so that the end section 40 which faces away from the inlet section 38 has a greater inclination than the intermediate section 39 which is longer than the section 40. Each groove 39 is engaged by a pertaining cutting jaw 4 by means of a guiding member having the form of a pin 41 parallel to the cutter head axis. In the starting position of the thread guiding device according to FIG. 3, in which the chuck 2 is farthest spaced from the cutter head 1, the guiding members 41 engage the transition sections between the inlet sections 38 and the guiding grooves 39, 40 of grooves 37. In this position, furthermore each section 38 is in alignment with a radial groove 42 pertaining to the respective end face of the bearing ring 18 which end face is located in the same plane as the end face 36 of the control disc 17 so that in this position, the cutting jaws 4 can be completely removed from the cutting jaw carrier or can be inserted thereinto. When the chuck 2 is axially displaced from its starting position toward the cutting head 1, it will be appreciated that in view of the reversing drive 30 the conntrol disc 17 rotates in such a way that the guiding member 41 of the cutting jaws 4 move along the first section 39 of the cam and thereby the cutting jaws 4 are moved correspondingly radially away from each other. At the end of the axial working movement of the chuck 2 there are located the guiding members 41 in the transmission ranges of the sections 39, 40 of the guiding grooves 37.

Figure 9:
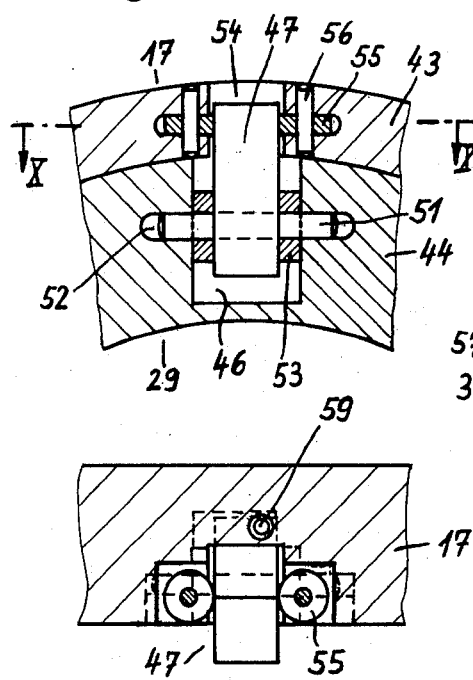
FIG. 9 is a section taken along the line IX—IX of FIG. 8.
Figure 8:
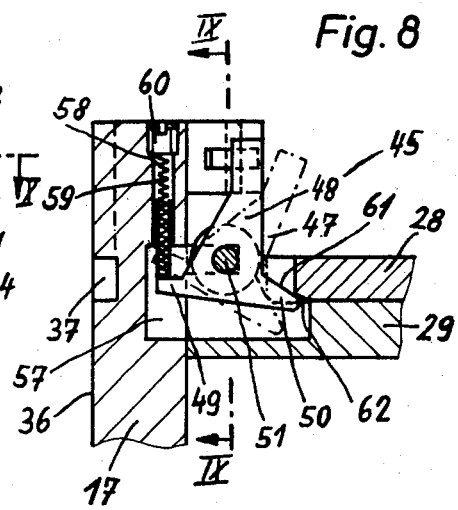
FIG. 8 illustrates the detail of VIII in FIG. 3 on an enlarged scale.
Figure 10:
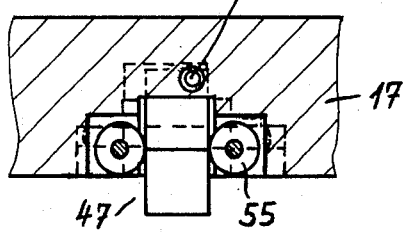
FIG. 10 is a section taken along the line X—X of FIG. 9.

The control disc 17 has that end face thereof which faces toward the output member 29 of the reversing transmission 30 provided with a protruding cylindrical mantle-shaped bearing neck 43 by means of which it is rotatably journalled on the outer circumference of an end collar 44 of the output member 29. This bearing neck 43 is additionally by means of its outer mantle surface journalled in the bearing ring 18. In its starting position opposite to the output member 29 of the reversing transmission 30, the control disc 17 is by means of a locking device 45 (see FIGS. 3 and 9–10) secured against rotation relative to the output member 29. This locking device 45 has a latch 47 which is mounted in an axial slot 46 in the end collar 44 of the output member 29. The latch 47 has approximately the shape of a T-lever with the arm 48 forming the foot portion of the T radially extending outwardly with regard to the cutter head axis 22. The two other arms 49, 50 extend in the direction toward the control disc 17 or in the direction toward the driving member 28 of the reversing transmission 30. The latch 47 is with a bolt 51 rotatable about an axis which extends at a right angle with regard to the cutter head axis 22 or to an axis which is tangential to the axis 22. The bolt 51 is inserted into a groove 52 at the pertaining end face of the end collar 44 of the output member 29. The groove 52 is relative to the diameter of the bearing bolt 51 considerably deeper while adjacent to the latch 47 and on both sides rollers 53 are mounted on the bearing bolt 51. These rollers 53 slidably engage the lateral surfaces of the latch 47 and the inner surfaces of the axial slot 46 while the diameter of the rollers 53 is such that the rollers merely touch those end faces of the control disc 17 which face the rollers. In this way the bearing bolts 51 are prevented from being displaced tranverse to the longitudinal direction of groove 52 in the latter. The radially outwardly extending arm 48 of latch 47, which arm forms the latching member, has in the bearing neck 43 associated therewith a radial slot forming the latch opening. The lateral surfaces of this slot 54 are provided with depressions in which two rollers 55 located opposite to each other with bolts 56 are rotatably mounted. The bolts 56 are parallel to the axial plane of the cutter head 1 which plane extends through the center of the opening 54, and are located at a right angle with regard to the cutter head axis 22. The free space between the rollers 55 is only slightly greater than the width of the latch member 48. In the latching position of the latch 47, the latch member 48 is located between the rollers 55 so that the control disc 17 is secured against rotation and connected to the output member 29 of the reversing transmission 30. When the latch 47 is pivoted out of its latching position to the non-latching position indicated in FIG. 8 in dot-dash lines, the latching member 48 leaves the latching opening 54 so that now the control disc 17 can rotate relative to the output member 29. The arm 49 of latch 48 which is directed toward the control disc 17 engages a recess 57 provided on the pertaining end face of the control disc 17. This recess 57 extends around the cutter head axis 22 to an extent which is greater than the maximum relative rotation of the control disc 17 relative to the output member 29 so that the rotatability of the control disc 17 relative to the output member 29 is not affected by the arm 49 which engages the recess 57. Inserted into a radial bore 58 in the control disc 17 is a helical pressure spring 59 which, for instance, through a pin guided in the bore rests against the arm 49 of the latch 47 and thus urges the same toward its locking position. The helical pressure spring 59 may also be guided in a sleeve extending into the recess 57 and may rest directly against the arm 49. Inserted into the bore 58 from the outer circumference of the control disc 17 is a screw 60 by means of which the preload of the helical pressure spring 59 may be varied. In the starting position of the control disc 17 opposite to the output member 29, the spring 59 rests, in conformity with FIG. 10, laterally against one side of the arm 49 of latch 47. When the control disc 17 in its direction of operation is rotated relative to the output member 29, the spring 59 slides on the arm 49 to the other side thereof. Thus, spring 59 acts at all times upon the latch 47. The arm 50 of latch 47 which arm is directed toward the driving member 28 of the reversing transmission 30 forms at its inner side an inclined running-up surface 61 which, when the latch 47 is in locking position, is located in the path of movement of the inner edge 62 of the pertaining end of the driving member 28. If the clamping chuck 2 moves in the described manner toward the cutter head 1, at the end of this movement the inner edge 62 moves onto the inclined surface 61 so that the latter during the end phase of the axial movement of the chuck 2 pivots into the unlocking position which is indicated in dot-dash lines in FIG. 8.

Figure 12:
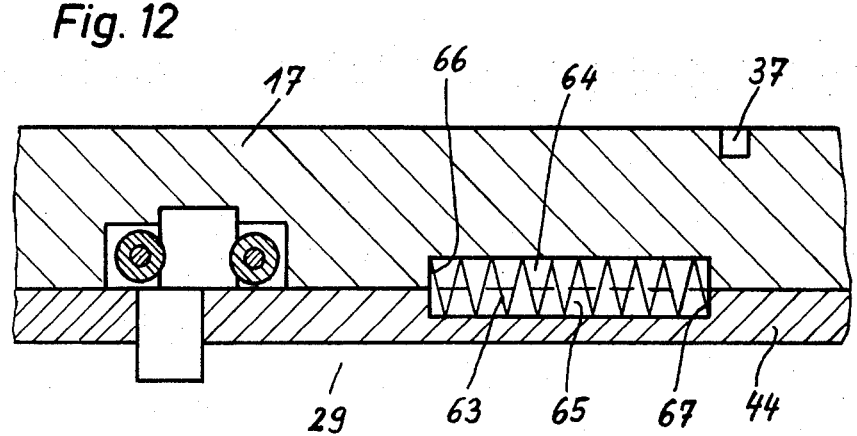
FIG. 12 is a section similar to that of FIG. 11 but with the work end position of the thread cutting device.
Figure 11:
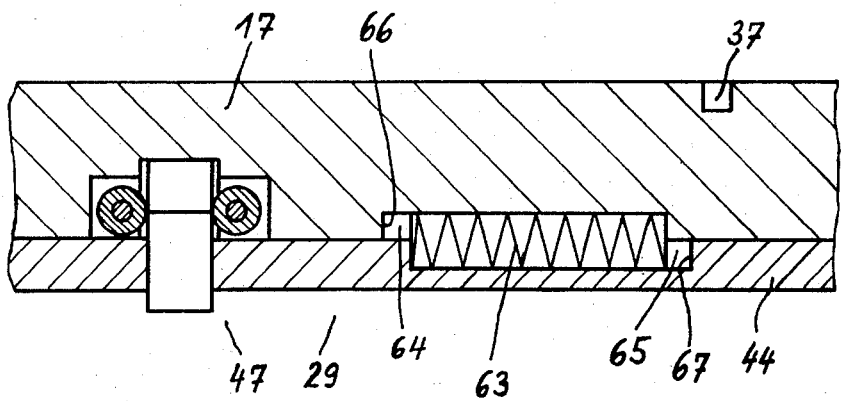
FIG. 11 is a section similar to that of FIG. 10 but in a wound-off illustration.
Figure 13:
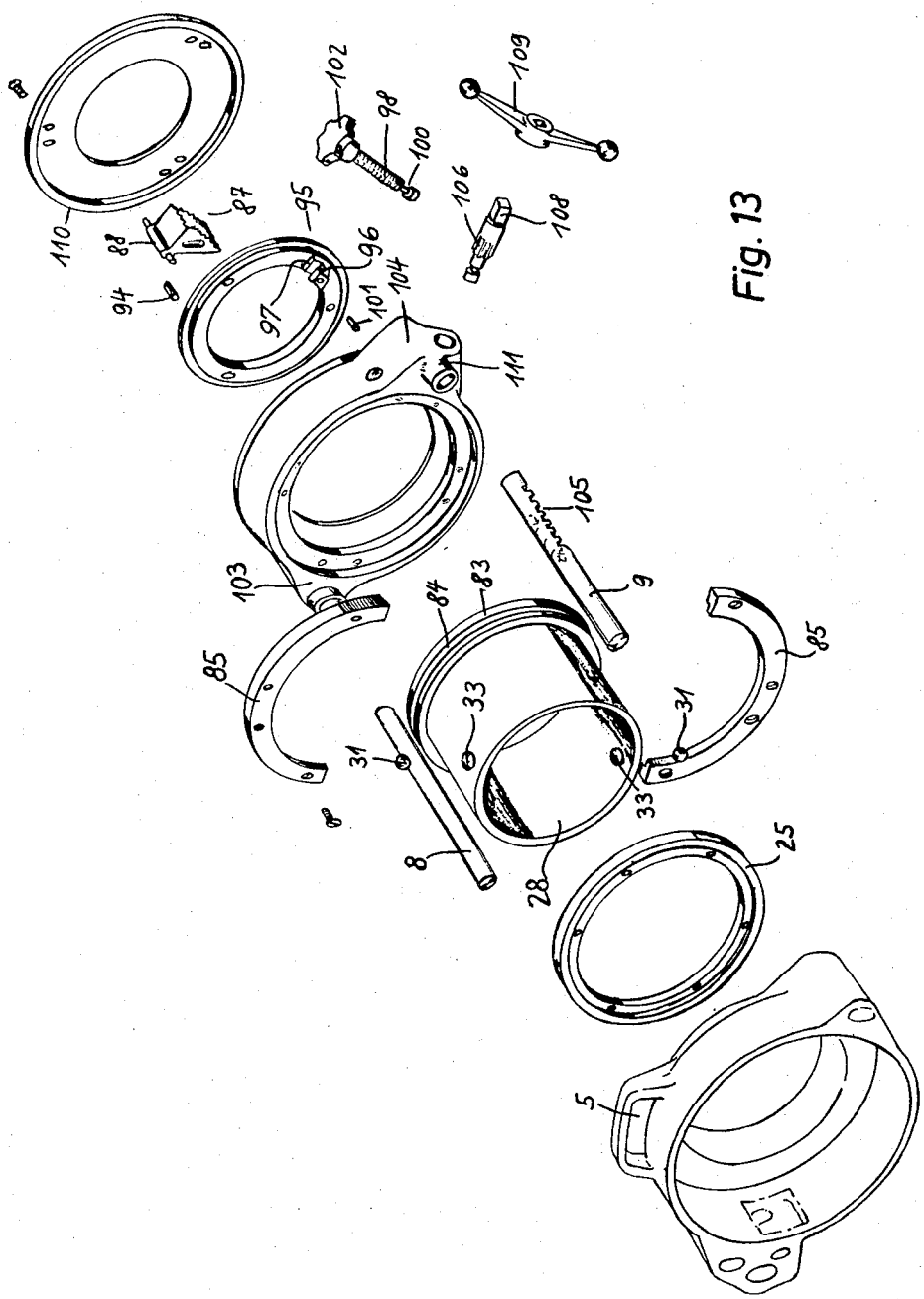
FIG. 13 illustrates the chuck of the thread cutting device of FIG. 1 in an exploded isometric illustration.
Figure 14:
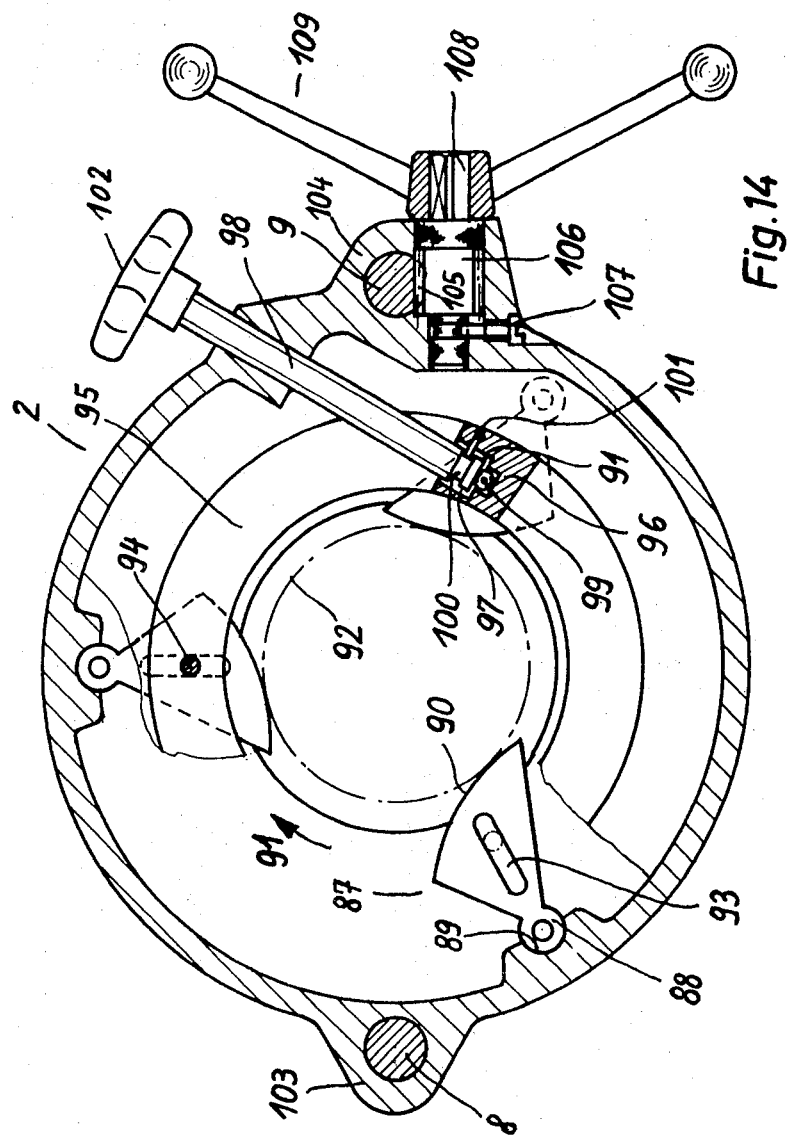
FIG. 14 represents a section through the chuck on an enlarged scale, said chuck being taken at a right angle with regard to the chuck axis.
Figure 15:
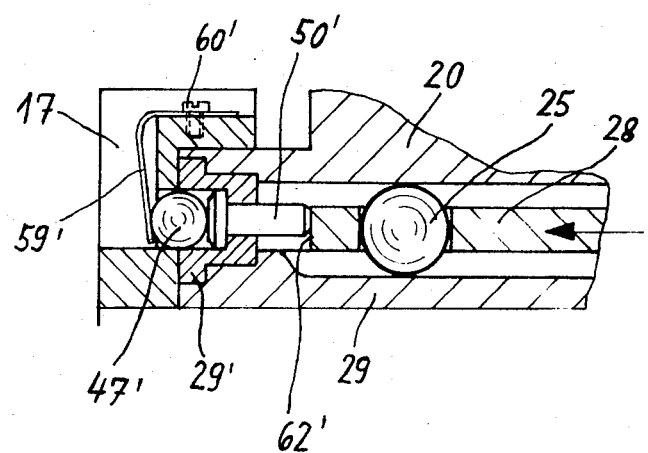
FIGS. 15 and 16 illustrate a modified embodiment of the present invention.

Now the control disc 17 is able to rotate relative to the output member 29 and thereby relative to the cutting jaw carrier 3 in its direction of rotation. The control disc 17 is spring-urged in its direction of operative rotation relative to the driving member 29 of the reversing transmission 30. To this end, as specifically shown in FIGS. 3 and 11, 12, there is provided a pitch circle-like helical pressure spring 63 extending about the cutter head axis 22. This spring 63 is arranged on that end face of the control disc 17 which faces toward the end collar 44 of the output member 29 and is also located on the pertaining end face of collar 44. The groove 65 in the collar 44 is open toward the circumferential surface of the collar 44 which means it is angle-shaped in cross section. In the starting position of the control disc 17 relative to the output member 29 according to FIG. 11, the two grooves 64, 65 are offset in their longitudinal direction with regard to each other so that the spring 63 with its ends rests only against the end face 66, 67 of a groove 64, 65 respectively. When the latch 47 is pivoted in the described manner into its release position, the spring 63 turns the control disc 17 relative to the output member 29 to a certain extent further in the operative rotary direction. The guiding member 41 of the cutting jaws 4 will then move from the transition ranges of the groove sections 39, 40 of the guiding grooves to the end sections 40 thereof which have the greatest inclination and bring about a fast radial movement away of the cutting jaws 4 to their opening position. The cutter head 1 will thus at the end of the thread cutting operation open automatically so that the work piece is freed from the jaws 4.

Figure 6:
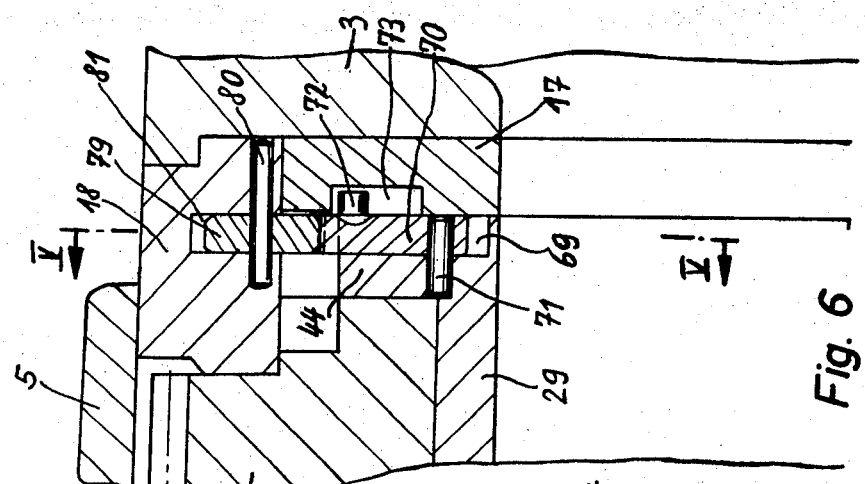
FIG. 6 represents a section taken along the line VI—VI of FIG. 5.
Figure 5:
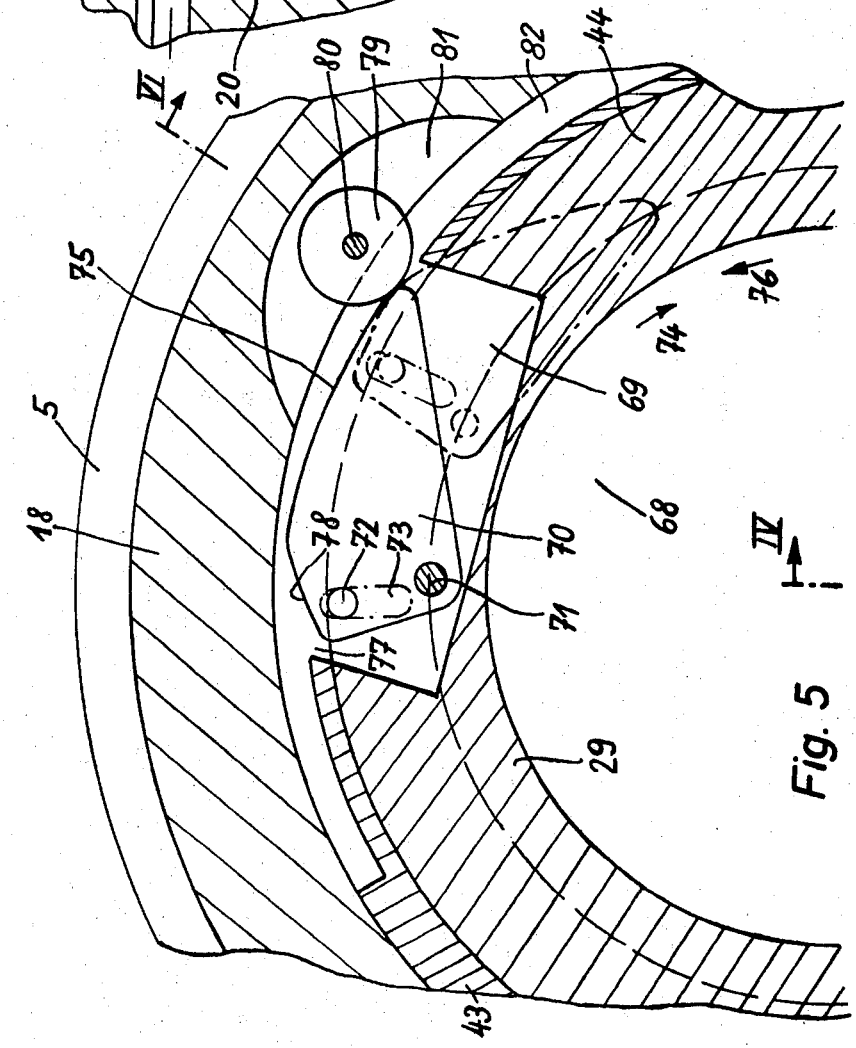
FIG. 5 is a partial section taken along the line V—V of FIGS. 3 and 6.

In this end position of operation of the control disc 17, spring 63 (FIG. 12) engages with each end the pertaining end surfaces 66, 67 of both grooves 64, 65 whereby the control disc 17 forms a return follower. It will be appreciated that by an axial displacement of the chuck 2 away from the cutter head 1, the return of the thread cutting device to its starting position is effected, the output member 29 turns back counter to its operative direction of rotation and through spring 63 at the same speed takes along the control disc 17. In order to make sure that the control disc 17 during this return operation is also automatically returned relative to the output 29 to its starting position and is again locked, a return advance drive 68 is provided according to FIGS. 5 and 6, by means of which the control disc 17 and the output member 29 are operative connected within a range of the return stroke of the chuck 2. This return advance drive 68 has a return lever 70 which is mounted in a cutout 69 of collar 44 of the output member 29 of the reversing transmission 30. The lever 70 is pivotable with a bolt 71 about an axis which is parallel to the cutter head axis 22. With reference to the cutter head axis 22 opposite the bearing bolt 71 and radially further outwardly, the return lever 70 has a follower in the form of a pin 72 which projects toward the control disc 17 through the peratining lateral surface. Pin 72 engages an opening on the pertaining end face of control disc 17, said opening being formed by a radial slot 73. That edge of the plate-shaped lever 70 which faces away from the cutter head axis 22 and which with regard to the pivot axis 71 extends in the return direction indicated by the arrow 74 forms a running up cam 75 which ascends in a direction opposite to the return direction indicated by the arrow 74, in other words, ascends radially outwardly in working direction indicated by the arrow 76 and is located radially outwardly of the outer circumference of the end coillar 44 of the output member 29. The bearing neck 43 of the control disc 17 is in this range likewise provided with a cutout 77 through which the lever 70 projects. The cam 75 merges at that end which is located near the pivot bearing bolt 71 with an edge section 78 which has an inclination opposite to that of the cam 75. In the direction of movement of the cam 75 there is provided a running-up member in the form of a roller 79, which roller is rotatable about an axis 80, said roller being rotatable in a depression 81 on the inner mantle surface of the bearing ring 18. In order to be sure that the control disc 17 is not impeded as to its rotation with regard to the bearing ring 18, the outer mantle surface of the bearing neck 43 has a pitch circle-shaped circumferential groove 82 engaged by the member 79. In the end position of operation, of the control disc 17, the cam 75 — with regard to the direction of rotation of operation indicated by the arrow 76 — is located ahead of the member 79 in such a way that its pertaining end which radially is located farthest inside will engage the member 79. If now, in the described manner, by returning the chuck 2, the output member 29 of the reversing drive 30 is turned back relative to the cutting jaw carrier 3 and the members 18, 20 connected thereto in the return direction indicated by the arrow 74, the cam 75 of the return lever 70 moves along the member 79. As a result thereof, the return lever 70 is, in conformity with FIG. 5 turning clockwise and is pivoted about its axis 71 whereby through the follower 72 is takes along the control disc 17 in such a way that the latter is rotated relative to the output member 29 in the return direction indicated by the arrow 74 until the latch 47 due to the force of the spring 59 snaps into the latching opening 54 so that the control disc 17 is again locked relative to the output member 29. This arrangement is such that the axial plane of the cutter head which passes through the central plane of the follower 72 will in one position on one side and in the other position indicated in dot-dash lines in FIG. 5 of the return lever 70 be located on the other side of the pivot axis 71 of the return lever 70.

Figure 3:
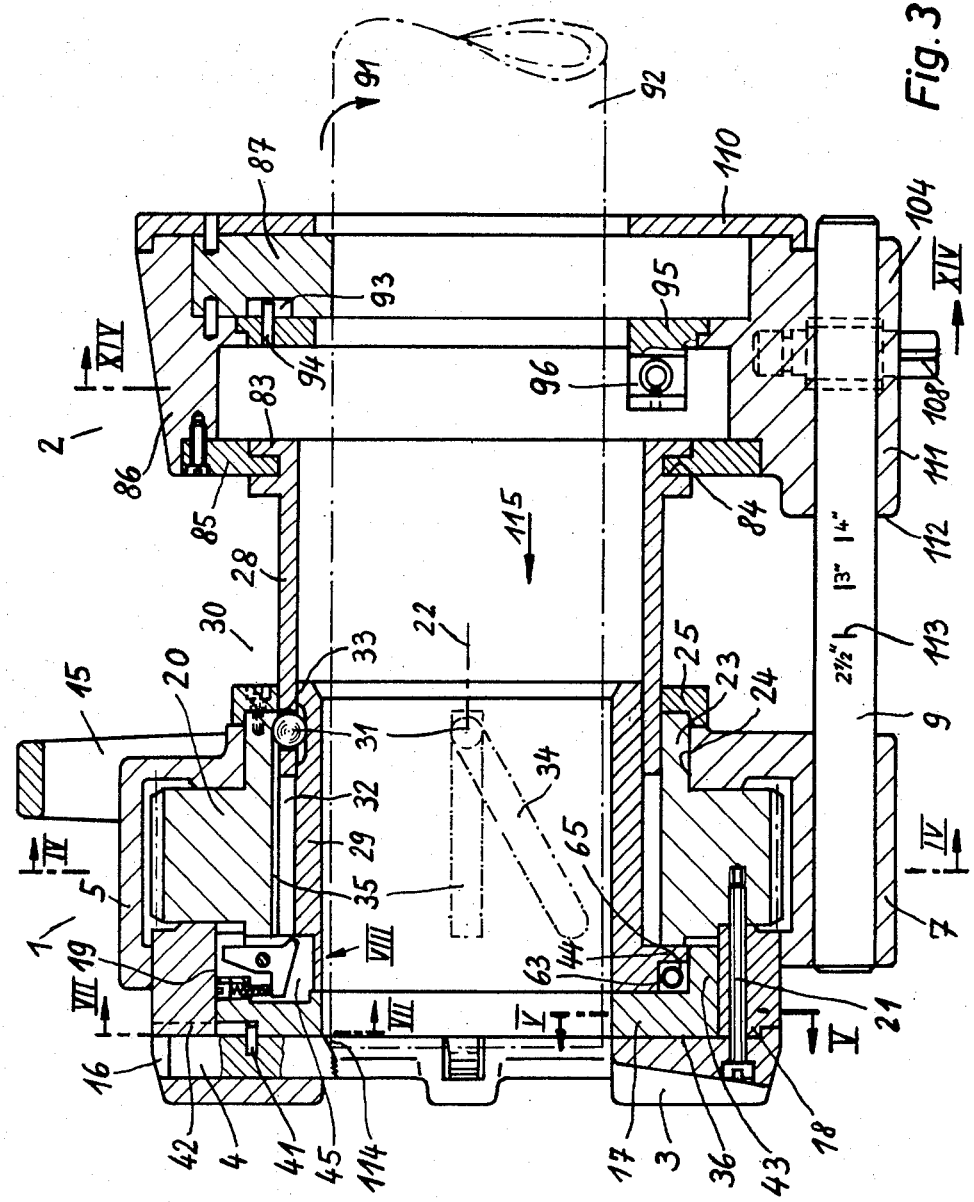
FIG. 3 represents an axial section through the thread cutting device according to FIG. 1, said section being taken along the line III — III of FIG. 4.

As shown in FIG. 3, the driving member 28 has that end thereof which faces toward the chuck 2 provided with an end collar 83 which on the outer mantle surface is provided with a circumferential groove 84 slidably engaged by a bearing ring 85. The bearing ring 85 is connected to that end face of housing 86 of chuck 2 which end face faces toward the cutter head 1. As will be evident from FIGS. 1–3, 13 and 14, three clamping jaws 87 uniformly distributed about the axis of the chuck are arranged in the housing 86 of the chuck 2. These clamping jaws 87, by means of radially outwardly located bolt-shaped bearing extensions 88 pivotally engage bearing boxes 89 which are provided on the inner mantle surface of the housing 86. At their radially inwardly located ends, the clamping jaws 87 form spiral sectional ascending clamping surfaces 90 which clamp the workpiece 92 tighter with increasing torque which acts upon the workpiece in the rotary working direction of the cutting jaw carrier 3 which direction is indicated by the arrow 91.

The rotary working direction indicated by the arrow 91 of the cutting jaw carrier 3 is opposite to the relative working rotary direction indicated by the arrow 76 of the control disc 17. Between the clamping surface 90 and the bearing surface 88, each clamping jaw 87 has a slot 93 which extends approximately radially with regard to the axis of the chuck, said slots being engaged by pins 94. The pins 94 are provided on an annular clamping ring 95 which slidably engages those end faces of clamping jaws 87 which face toward the cutter head 1 and are rotatably journalled in housing 86 of chuck 2 for rotation about the axis of chuck 2. On that end face of the clamping ring 95 which faces away from the clamping jaws 87 there is provided a protruding extension 96 which has one lateral surface that is located approximately in an axial plane of chuck 2 provided with a depression 97 engaged by a clamping spindle 98 which is approximately tangential with regard to the chuck axis and is journalled in the housing 86 of the chuck 2. A ball 99 is arranged in a further depression provided in the bottom surface of the depression 97. The clamping spindle 98 rests with its end face against said ball 99. Adjacent to this end face, the clamping spindle 98 has a circumferential groove 100 which is engaged by a pin 101 which is approximately radial to said groove 100 and is arranged in the extension 96 and extends into the depression 97. The clamping spindle 98 has that end thereof which is located outside the housing 86 provided with a handle 102. By means of the clamping spindle 98, the clamping ring 95 may manually be turned in both directions of rotation, in which instance the clamping jaws 87 are actuated by the clamping ring 95. The clamping spindle 98 is located on that side of the axis of chuck 2 which side is located opposite the driving direction 10. The clamping spindle extends in an inclined manner upwardly and protrudes from the housing 86 and is equipped with the handle 102 above the hhorizontal axial plane of the chuck 2.

The housing 86 of chuck 2 is similar to the housing of the cutter head 1 provided with two lateral eyes 103, 104, which are located in the horizontal axial plane of the chuck 2. Guiding rods 8, 9 slidably engage the bores of said eyes 103, 104. The guiding rod 9 which is located opposite the driving device 10 has its bottom side provided with teeth 105 in the manner of a rack, which teeth are engaged by a pinion 106. The axis of rotation of said pinion 106 is located at a right angle to said teeth 105. The pinion 106 is rotatably journalled in the pertaining eye 104 and by a bolt 107 is secured against axial displacement and rotation. The pinion 106 has a square head 108 which protrudes beyond the housing 86 and eye 104, a double lever 109 may form a handle displaceably mounted on said square head 108. The central axis of the pinion 106 is located in a common plane with the central axis of the clamping spindle 98 and below the latter so that the handles 102, 109 are closely adjacent to each other, said common plane being at a right angle to the chuck axis.

Connected to that end face of the housing 86 of chuck 2 which faces away from the cutter head 1 is a substantially annular disc-shaped housing cover 110. The clamping jaws 87 slidably rest against said cover 110 while the inner diameter of said cover equals the inner diameter of the clamping ring 95. On that end face of eye 104 of the chuck housing 86 which faces toward the chuck 1, there is provided a sleeve-shaped extension 111, the end face 112 of which at the upper side of the pertaining guiding rod 9 has associated therewith a scale 113 for the respective pipe sizes so that the end face 112 forms the counter mark for the scale lines of the scale 113.

For purposes of cutting a thread, the tubular workpiece 92 is with its pertaining end on that side which faces away from the cutter head 1 introduced into the chuck 2 and is advanced axially until its end edge abuts the cutting inclinations 114 of the cutting jaws 4. Thereupon by turning the clamping spindle 98, the workpiece 92 is tightened in the chuck 2. After turning on the motor which drives the driving device 10, the workpiece 92 is by rotating the handle 109 pressed further against the cutting jaws 4 in the advancing direction indicated by the arrow 115 whereby the cutting jaws 4 start the thread and then pull the workpiece 92 further in the advancing direction indicated by the arrow 115. During this feeding movement of the workpiece 92, the control disc 17 by the reversing drive 30 is turned in such a way that the cutting jaws 4, radially move synchronously away from each other with the advancing movement so that a conical thread is formed. When the edge 62 of the driving member 28 and the reversing drive 30 has reached the latch 47 of the latching device 45, the latter is tilted to its releasing position so that the control disc 17 is now rotated relative to the output member 29 of the reversing drive 30 under the influence of the spring 63 whereby the cutting jaws 4 are fully radially moved outwardly to the pertaining end position and thus no longer engage the workpiece. Thereupon, by means of the handle 109, the workpiece 92 with the chuck 2 can again be returned to their starting position. The output member 29 of the reversing drive 30 is again moved relative to the driving member 29, and the control disc 17 is again moved relative to the output member 29 to their respective starting positions. Similarly, the cutting jaws 4 are returned to their radially inwardly located working position. By turning the clamping spindle 98, the chuck 2 can be opened and the workpiece 92 provided with the cut thread can be removed whereupon immediately a further workpiece can be machined.

Figure 4:
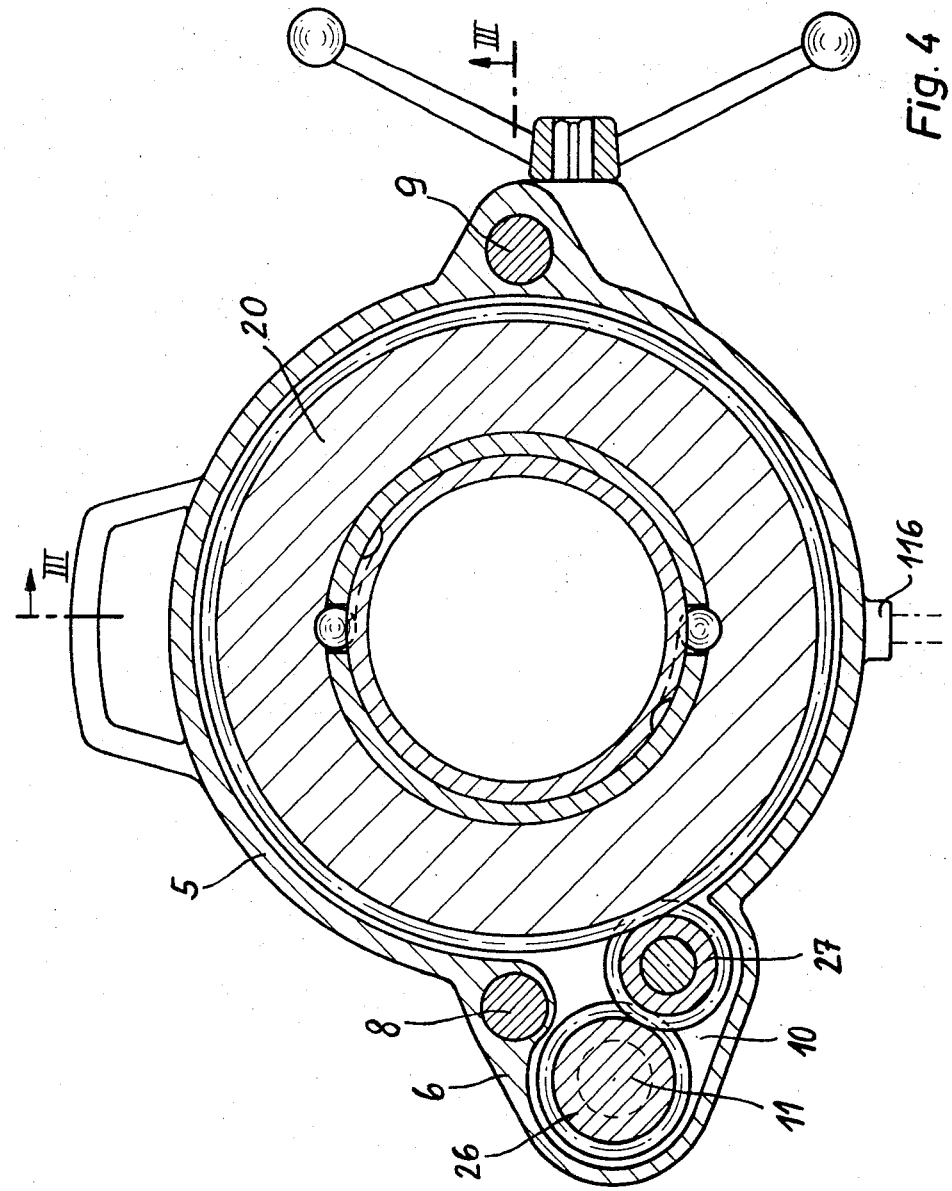
FIG. 4 represents a section taken along the line IV—IV of FIG. 3.

For purposes of supporting the thread cutting device, the underside of the carrier housing 5 of cutting head 1 may be provided with an extension 116 for receiving a supporting column or the like (FIG. 4).

According to a further suggestion of the invention, the latching or locking of the flange bushing 29 with regard to the adjusting disc 17 may instead of by means of lever 47 be effected by an antifriction body such as a ball 47'.

In this connection a bearing bushing 29' is provided in the flange of bushing 29 for axially receiving the push rod 50'. The collar of the push rod 50' is outwardly slightly slanted so that during the unlocking operation it will under no circumstances exert no locking effects upon the adjusting disc 17. The locking ball 47' is by means of an angled off spring 59' which is connected to an adjusting disc of the reversing transmission 30 by screw 60', pressed against the collar of the push rod to such an extent that no material axial component will when the locking device is under load act upon the locking ball 47' and that the locking ball will be safely held in this locking position.

Figure 16:
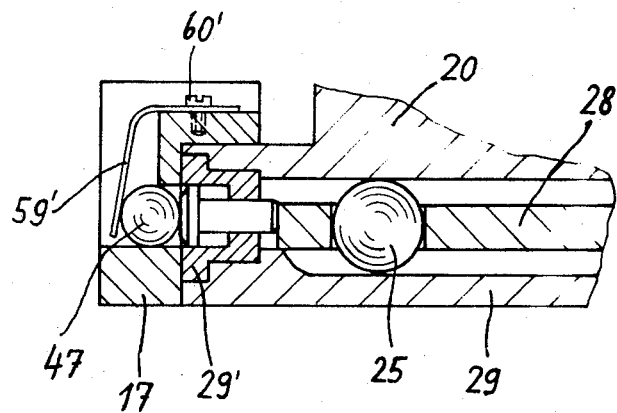

During the unlocking operation, the push rod 50' is by the front edge of control sleeve 28 subjected to pressure against the thrust of spring 59' to such an extent that ball 47' moves into FIG. 16 position and the adjusting disc 17 in view of the pressure spring 63 is turned further relative to the flange bushing 29.

It is, of course, to be understood that the present invention is, by no means, limited to the specific showing in the drawings, but also comprises any modifications within the scope of the appended claims.

What is claimed is:

1. In a device for cutting male threads on a workpiece, especially conical threads such as pipe threads; a chuck housing adapted for receiving a workpiece from one side and having chuck means therein operable to grip a workpiece on the axis of the housing, a cutter housing on the other side of the chuck housing coaxial therewith and non-rotatably connected to the chuck housing but moveable axially relative thereto, a cutting jaw carrier rotatable in said cutter housing and including means for guiding thread cutters radially relative to the common axis of said housings, a control disc in said cutter housing rotatable relative to said carrier and including means for engaging cutters in said carrier and for actuating the cutters in the radial direction, a drive connected to said carrier for driving the carrier in rotation in said cutter housing whereby cutters in said carrier will cuttingly engage the end of a workpiece gripped in said chuck and cause axial movement of the workpiece and chuck housing relative to said cutter housing, drive means connected to said control disc and said chuck housing for rotating said control disc in a direction to cause cutters in said carrier to move radially outwardly, said drive means including a first sleeve element rotatably but nonaxially moveable connected to said chuck housing, a second sleeve element having one end telescoping one end of said first sleeve element, connecting means connecting the other end of said second sleeve element to said control disc, ball means captive in said one end of said first sleeve element, longitudinal guide means nonrotatable relative to said carrier engaging one radial side of said ball means, and helical groove means in said one of said second sleeve element engaging the other radial side of said ball means.

2. A device according to claim 1 in which said second sleeve element is inside said first sleeve element.

3. A device according to claim 1 in which said drive includes a gear fixed to said carrier and having a portion surrounding the telescoping ends of said sleeve elements, said longitudinal guide means being formed on the inside of said gear.

4. A device according to claim 1 in which said connecting means includes a releasable latch, and spring means acting circumferentially between said second sleeve element and said control disc.

5. A device according to claim 4 which includes cam levers pivotally connected to said second sleeve element and operable to drive said control disc in one direction of rotation.

6. A device according to claim 4 in which said latch is spring biased toward connecting position and includes a portion engageable by said first sleeve element to move said latch into disengaged position in response to a predetermined extent of axial movement of said first sleeve element during a working operation.

7. A device according to claim 6 in which said spring means displaces said control disc in working direction on said second sleeve element when said latch is disengaged, and cam means on said second sleeve element to engage and return said control disc toward starting position during retracting movement of said chuck housing following a thread cutting operation.

8. A device according to claim 1 in which said control disc has a groove therein for each cutter to be actuated thereby, each groove having a first section spiralling outwardly from a circumferential path at a first rate and a second section spiralling outwardly from a circumferential path at a second and higher rate, said sections in end to end relation.

9. A device according to claim 8 in which each grooove has a radial inlet section at the end of said first section which is opposite said second section.

10. A device according to claim 4 in which said latch is spring biased toward connecting position and includes a portion engageable by said first sleeve element to move said latch into disengaged position in response to a predetermined extent of axial movement of said first sleeve element during a working operation, said control disc having a groove therein for each cutter to be actuated thereby, each groove having a first section spiralling outwardly from a circumferential path at a first rate and a second section spiralling outwardly from a circumferential path at a second and higher rate, said sections in end to end relation, each cutter having a pin engaging a respective groove and each pin being disposed at the juncture of the first and second sections of the respective groove when said first sleeve element moves said latch into disengaged position, said spring means upon disengagement of said latch moving said control disc to cause the pins to move in the second section of the respective grooves and thereby retract the cutters radially outwardly.

11. In a groove cutting device for cutting conical threads on a workpiece, a cutting head having a cutting jaw carrier on which at least one cutting jaw is mounted for radial adjustment, a control disc coaxial with and rotatable relative to the cutting jaw carrier for radial adjustment of said cutting jaw, a clamping chuck for holding said workpiece and axially shiftable relative to said cutting head, driving means for producing relative rotation of said chuck with said workpiece and said cutting jaw carrier, a first sleeve coaxial with said cutting head and connected for axial movement with said clamping chuck, a second sleeve coaxial with said first sleeve and connected for rotational movement with said control disc, said first and second sleeves having their ends telescopically engaged, interengaging means between said cutting head, and said first and second sleeves to provide relative rotation between said workpiece and said cutting head and sleeves, said interengaging means including an element axially movable with said first sleeve relative to said second sleeve, said second sleeve having a complementary longitudinal guide means which said element movably engages, said longitudinal guide means extending at an angle to an axial plane so that said second sleeve and said control disc are rotated relative to said first sleeve and clamping jaw carrier upon axial movement of said first sleeve with said clamping chuck and workpiece.

12. A device in combination according to claim 11, in which said interengaging means includes said longitudinal guide means provided on an outer peripheral surface of said second sleeve and a longitudinal guide means on an inner peripheral surface of the cutting head in the form of grooves whereby said first sleeve engages between these peripheral surfaces.

13. A device in combination according to claim 12, in which said element engages in the pertaining longitudinal guide means of said second sleeve and said cutting head.

14. A device in combination according to claim 12, in which said element is a ball arranged in a cage hole in a wall portion of said first sleeve and projecting over both inner and outer peripheral surfaces of said first sleeve.

15. A device in combination according to claim 13, in which said longitudinal guide means of the cutting head extends axially.

* * * * *